United States Patent [19]

Yates et al.

[11] 4,185,472
[45] Jan. 29, 1980

[54] FIBER REINFORCED COMPOSITE SHAFT WITH METALLIC CONNECTOR SLEEVES MOUNTED BY RADIAL PIN INTERLOCK

[75] Inventors: Derek N. Yates, Los Gatos; John C. Presta, San Jose, both of Calif.

[73] Assignee: Celanese Corporation, New York, N.Y.

[21] Appl. No.: 890,230

[22] Filed: Mar. 27, 1978

[51] Int. Cl.² .............................................. F16C 3/02
[52] U.S. Cl. ...................................... 64/1 S; 29/432; 138/109; 285/242
[58] Field of Search ............... 29/432; 285/238, 239, 285/242; 403/224, 378; 138/109; 64/1 R, 1 S; 156/172, 173

[56] References Cited

U.S. PATENT DOCUMENTS

| | | | |
|---|---|---|---|
| 1,562,954 | 11/1925 | Goodall | 138/109 |
| 2,369,697 | 2/1945 | Werkenthin et al. | 285/242 |
| 2,890,900 | 6/1959 | Williamson, Jr. et al. | 285/238 |
| 3,661,670 | 5/1972 | Pierpont, Jr. | 138/109 |

FOREIGN PATENT DOCUMENTS

| | | | |
|---|---|---|---|
| 36756 | 1/1968 | Finland | 285/242 |
| 1356393 | 6/1974 | United Kingdom | 285/239 |

*Primary Examiner*—Lowell A. Larson
*Attorney, Agent, or Firm*—Kenneth A. Genoni

[57] ABSTRACT

A tubular fiber reinforced composite shaft is formed (as described) which integrally incorporates a metal sleeve or connection at the end thereof. Initially a metal sleeve having apertures is positioned upon a segment of a mandrel. Fibrous material bearing a non-solidified resinous material is applied around the mandrel and around the apertures in the sleeve. Sharpened spikes are pressed through the fibrous material and into the apertures of the sleeve. Additional fibrous material bearing the non-solidified resinous material is applied around the outer ends of the spikes. The resinous material next is solidified to form a tubular composite shaft whereby a secure torsion-transmitting connection is made with the sleeve, and the mandrel is removed.

12 Claims, 8 Drawing Figures

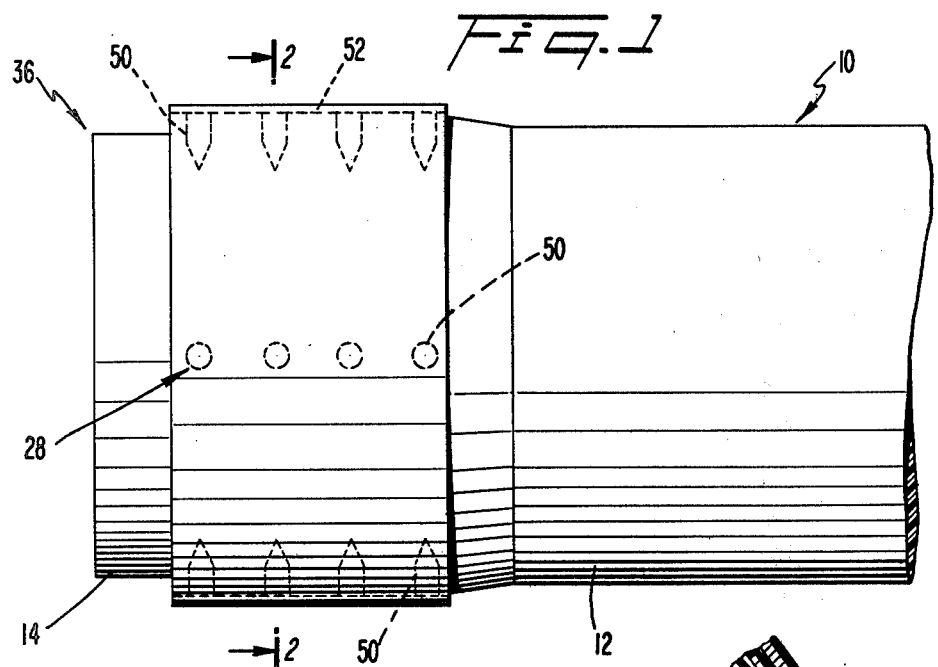
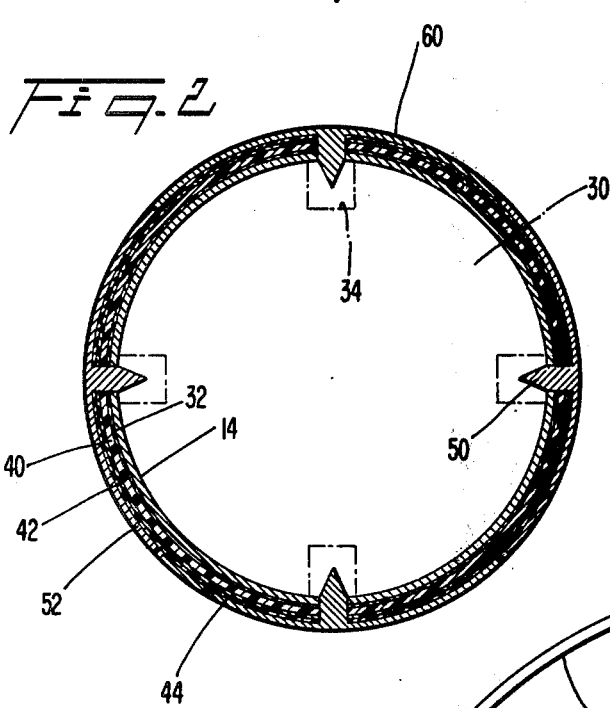
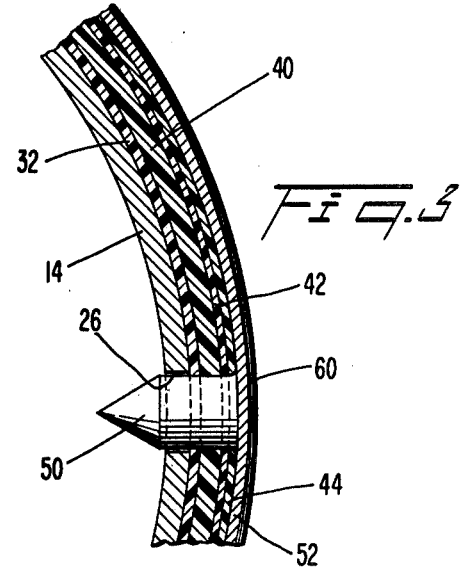
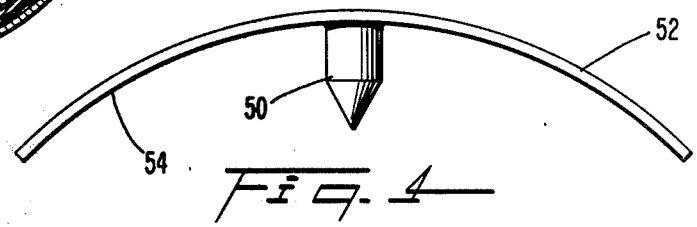
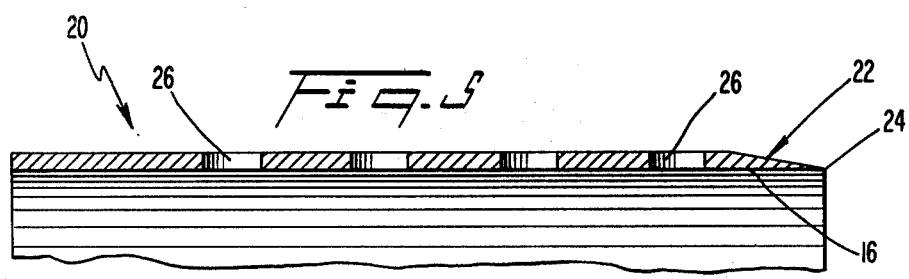

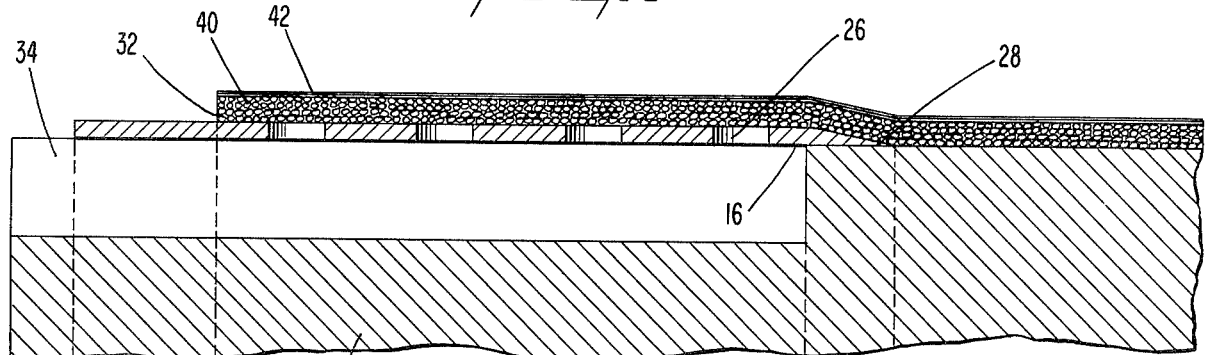
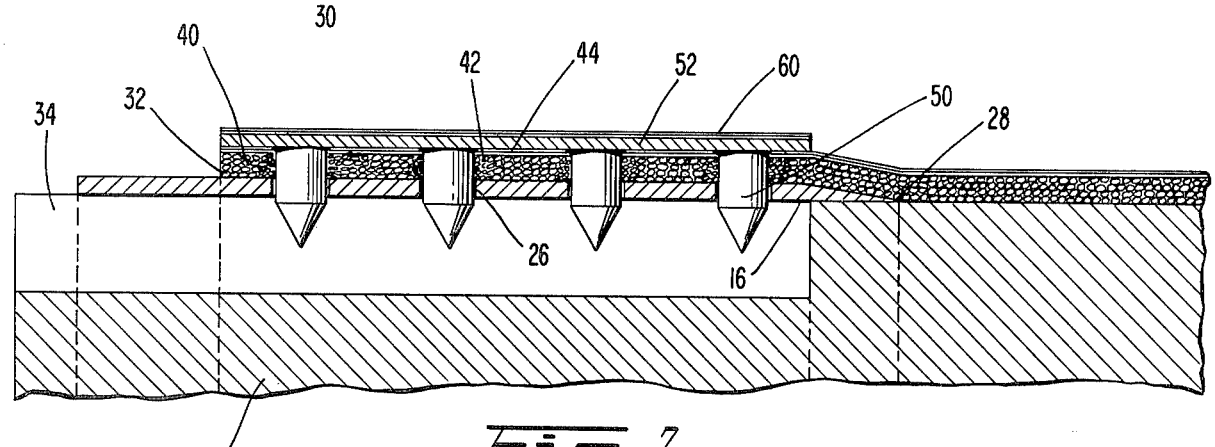
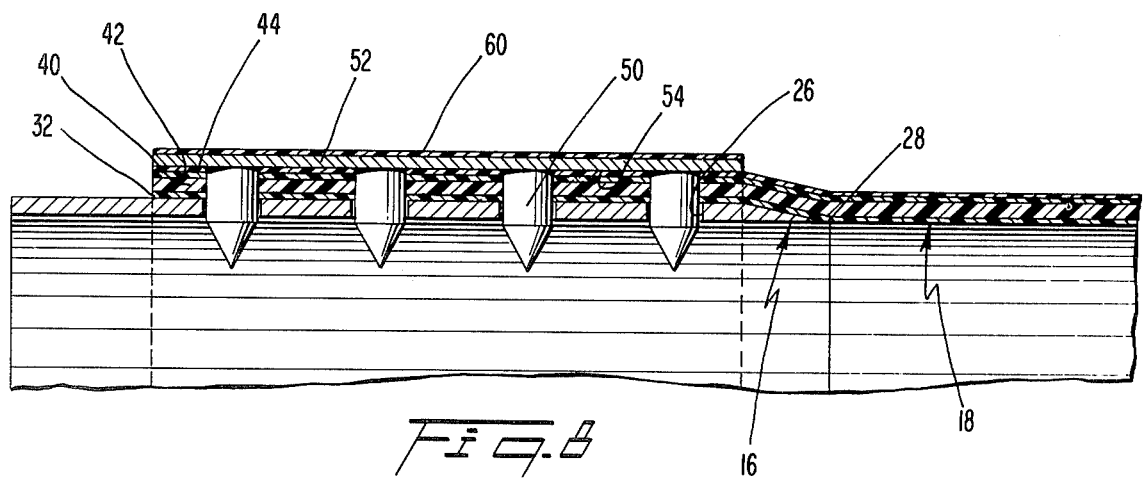

FIBER REINFORCED COMPOSITE SHAFT WITH METALLIC CONNECTOR SLEEVES MOUNTED BY RADIAL PIN INTERLOCK

BACKGROUND AND OBJECTS OF THE INVENTION

This invention relates to fiber reinforced composite shafts and, more especially, to vehicle drive shafts comprising a fiber reinforced resinous shaft body with metallic coupling sleeves mounted at the ends thereof.

Tubular fiber reinforced composites have been heretofore proposed, as demonstrated by U.S. Pat. Nos. 2,882,072 issued to Noland on Apr. 14, 1959, and 3,661,670 issued to Pierpont on May 9, 1972. In the Pierpont patent, for example, it has been proposed to form such composites from a resinous material which is reinforced by glass fibers. In particular, filaments bearing a non-hardened resinous material (i.e., an uncured thermosetting resin) are wound around a mandrel until the desired thickness has been established. The reinforcing fibers can be positioned within the wall of the tubular composite in varying angular relationships. Thereafter, the resinous material is solidified (i.e. is cured). A premolded threaded end portion can be mounted at the ends of the tubular composite, such as by the winding of filaments directly around the end portion during the winding process.

It recently has been proposed to form vehicle drive shafts from tubular fiber reinforced composites, as demonstrated by U.S. Pat. No. 4,041,599 issued to Smith on Aug. 16, 1977, and published Japanese Application No. 52-127542, entitled "Carbon Fiber Drive Shaft" which claims priority for the filing of U.S. Ser. No. 676,856 on Apr. 14, 1976 of Gordon Peter Morgan, now Pat. No. 4,089,190. In the Japanese application filaments bearing a non-hardened resinous material (e.g., an uncured thermosetting resin) are wound around a mandrel until the desired thickness has been established, whereupon the resinous material is cured. Zones or layers are positioned circumferentially within the wall of the shaft in the specific angular relationships there disclosed.

The above-mentioned Smith patent proposes the attachment of a carbon fiber reinforced epoxy drive shaft directly to a universal joint extension by a specific bonding technique.

Fiber reinforced composite shafts exhibit advantages over metallic shafts, i.e., they are lighter in weight, more resistant to corrosion, stronger, and more inert.

In copending application Ser. No. 890,232 filed concurrently herewith, of Derek N. Yates and David B. Rezin entitled "Improved Carbon Fiber Reinforced Composite Drive Shaft", a fiber reinforced composite drive shaft is disclosed which exhibits improved service characteristics and the necessary strength and durability to withstand the various stresses encountered during vehicle operation. The disclosure of that copending application is herein incorporated by reference as if set forth at length.

Since direct welding or bonding of a resin shaft to metal does not normally create a sufficiently strong and durable connection on a consistent and reliable basis, the use of metallic connector sleeves mounted at the ends of the shaft in accordance with the concept of the present invention provides a means for accomplishing a secure welded connection similar to that utilized with conventional metallic shafts.

The high torque loads which are to be transmitted by a vehicle drive shaft require that an extremely strong and durable torsional drive connection be established between the sleeves and shaft body. Previous proposals for mounting sleeves by employing adhesives or by wrapping the filament bundles around circumferential grooves on the sleeve periphery, cannot be relied upon to provide a connection of the requisite strength and durability.

It is, therefore, an object of the present invention to provide a novel, fiber reinforced resin shaft which minimizes or obviates problems of the types discussed above.

It is an additional object of the invention to provide a novel, fiber reinforced resin shaft suitable for use as a drive shaft in a vehicle power train.

It is a further object of the invention to provide novel methods and apparatus for securing metal connector sleeves to the ends of fiber reinforced resin shafts to enable the shafts to transmit high torsional loads.

BRIEF SUMMARY OF THE INVENTION

These objects are achieved by the present invention wherein a tubular fiber reinforced composite shaft is formed. A metal sleeve is positioned upon a segment of a mandrel. Fibrous material is applied upon the mandrel and the outer periphery of the sleeve. The fibrous material bears a non-solidified resinous material. Pins are inserted inwardly through the previously applied fibrous material and into the sleeve. A pin retainer is applied around the outer ends of the pins exteriorly of the previously applied fibrous material to retain the pins. The resinous material is solidified with the pins disposed in the fibrous material and the apertures to create a torsion-transmitting connection between the metal sleeve and the fibrous material. Thereafter the mandrel is removed.

THE DRAWINGS

Other objects and advantages of the invention will become apparent from the following detailed description thereof in connection with the accompanying drawings in which like numerals designate like elements and in which:

FIG. 1 is a side elevational view of an end of a fiber reinforced composite shaft according to the present invention;

FIG. 2 is a cross-sectional view taken along line 2—2 of FIG. 1;

FIG. 3 is an enlarged fragmentary view of FIG. 2;

FIG. 4 is a side elevational view of a torsion-transmitting member according to the present invention;

FIG. 5 is a fragmentary, longitudinal sectional view of the torsion-transmitting mechanism; and FIGS. 6, 7 and 8 are fragmentary longitudinal sectional views of the shaft during various stages of fabrication.

DETAILED DESCRIPTION OF THE PREFERRED EMBODIMENT OF THE INVENTION

A drive shaft 10 according to the present invention comprises a reinforced resin shaft body 12 of cylindrical cross-section, and a metal connector sleeve 14 secured preferably at each end of the shaft body.

The connector sleeve 14 is generally cylindrical and formed of an appropriate metal, such as steel or aluminum for example. The sleeve includes an inner annular surface 16 of constant diameter which is substantially contiguous with an inner surface 18 of the shaft body located longitudinally inwardly thereof, as is evident from FIG. 8.

The inner end 20 of the sleeve 14 is tapered both longitudinally and radially inwardly at 22 (FIG. 5) to provide a feather edge 24 for the reception of windings of reinforced resin material as will be discussed.

The sleeve contains a plurality of pre-formed apertures 26 (FIGS. 1 and 5) which are preferably aligned in circumferentially spaced, longitudinally extending rows 28, the rows being spaced by ninety degrees. Of course, other suitable arrangements of the apertures are possible, as desired.

During fabrication of a preferred form of the shaft, a pair of connector sleeves are positioned on a mandrel 30 in a longitudinally spaced relationship. The sleeves engage the mandrel 30 somewhat snugly, but loosely enough to be removable therefrom. An appropriate clamping arrangement holds the sleeves 14 in place. The mandrel is coated with a release substance to resist the adherence thereto of resin or adhesives. Thereafter, the shaft body 12 is formed around both the mandrel and sleeve.

Construction of the shaft body 12 is preferably performed in a manner more fully described in the aforementioned application of Yates and Rezin. Summarized briefly, layers of fiber reinforced resin-impregnated material are applied, prefably in the form of bundles of substantially parallel continuous filaments bearing a non-solidified (i.e., liquid, soft and tacky, or molten) resinous material. The bundles can be dipped in an uncured liquid thermosetting resin, such as an epoxy resin, and then wound around the mandrel in multiple passes until a layer of desired thickness is established. Attention is further directed to U.S. Pat. Nos. 3,661,670, 3,202,569, and 3,231,442 for additional details concerning possible arrangements for the clamping of sleeves and winding of filament bundles. The disclosures of these patents are incorporated herein by reference as if set forth at length.

The term "layer" as used herein specifies a circumferential zone within the wall of the tubular drive shaft wherein the fibrous reinforcement is disposed in a specific configuration and differs from the adjacent zone(s) with respect to the configuration and/or composition of the fibrous reinforcement. A single layer may include a multiple pass alignment or buildup of fibrous reinforcement in a given configuration. The term layer encompasses an alignment wherein the fibrous reinforcement is disposed therein at both plus and minus a given angle which optionally can be builtup in multiple passes.

The fibers reinforce the thermoset resin matrix to impart necessary properties of strength and durability to the shaft. In this regard, glass fibers (e.g., E-glass or S-glass) and carbon fibers (i.e., either amorphous or graphitic) materials are preferred. The carbon fibers commonly contain at least 90 percent carbon by weight, and preferably at least 95 percent carbon by weight. Additionally preferred carbon fibers have a Young's modulus of elasticity of at least 25 million psi (e.g, approximately 30 to 60 million psi).

The plies of filament bundles are wound in various orientation relative to the longitudinal axis of the drive shaft, and can be built-up to different thicknesses, respectively. Preferably, an initial layer of glass fibers is applied at an angle of from $\pm 30°$ to $\pm 50°$ relative to a line parallel to the longitudinal axis of the shaft. Next, a layer of glass fibers is applied at an angle of from 0° to $\pm 15°$. Thereafter, a layer of carbon fibers is applied at an angle of from 0° to $\pm 15°$. Then a layer of glass fibers is applied at about an angle of from about $\pm 60°$ to 90°.

Of course the number and composition of layers, as well as their orientation and thickness may vary, depending upon the characteristics desired to be imparted to the shaft.

Rather than utilizing filament winding (e.g., wet winding or prepreg winding), other tube forming procedures can be employed, such as tube rolling, tape wrapping, or pultrusion, for example. In the former step, comparatively wide sections of resin impregnated tape are precut to patterns, stacked in sequence, and rolled onto the mandrel.

After the layers have been applied, the non-solidified resin is cured. In this regard, the resin may be of a self-curing type, or may be of a kind which cures in response to being subjected to heat and/or curing agent.

Relating more particularly to the present invention, the sleeve(s) 14 is positioned on the mandrel 30, such that the rows of apertures 26 are aligned with longitudinally outwardly open slots 34 in the mandrel 30. Thereafter, an initial layer 32 of glass fibers is wound around the mandrel and sleeves at about a $\pm 45$ degree angle. The layer terminates short of the outermost end of the sleeve, so that the outer portion 36 of the sleeve 14 remains exposed. The apertures 26 are circumferentially covered by this layer 32.

Thereafter, a layer 40 of glass fibers is wound around the layer 32 at about a zero degree angle.

Next, a layer 42 of graphite fibers is wound around the layer 40 at about a zero degree angle.

Finally, a layer 44 of glass fibers is wound at about a 90 degree angle around the layer 42.

It will be understood that any number of layers can be applied and at various angles and thicknesses, depending upon desired shaft characteristics.

Next, a plurality of torque transmitting elements are inserted through the fibrous material and the sleeve 14. The torque transmitting elements comprise pins 50, preferably in the form of sharpened metal spikes, which are affixed at their outer ends to enlarged base plates 52. The plates 52 are arc-shaped and the spikes extend from concave surfaces 54 of the plate (FIG. 4). Preferably, each plate 52 carries a plurality of spikes 50 arranged in a longitudinally extending row, in corresponding relation to the row 28 of apertures 26 in the sleeve 14.

A row of spikes is positioned externally of the outermost layer 44 of fibrous material, with the spikes aligned with the apertures 26 of the sleeve, and is pressed radially inwardly so as to penetrate the layers of fibrous material and enter the recesses 26. The spikes 50 project radially inwardly beyond the apertures 26 and into the slots 34 of the mandrel.

The base plate 52 abuts against the outermost layer 44 of fibrous material to limit inward travel of the row of spikes.

A plurality of rows of spikes 50 are inserted into corresponding apertures 26 of the sleeve, with the base plates 52 associated therewith disposed in circumferential end-to-end fashion to form a collar extending around the outermost layer of fibrous material. Preferably, there are four rows of spikes 50, with the base prefate 52 thereof defining an arc of ninety degrees, although it will be understood that other arrangements of spikes may be utilized as desired.

After all of the spikes 50 have been pressed into position, a spike-retaining layer 60 of reinforced fibrous material bearing non-solidified resin is applied around the base plates 52 to retain the spikes 50 in position. Preferably, the layer 60 extends longitudinally inwardly only as far as the inner end of the base plates 52.

Thereafter, the non-solidified resin is cured to bond the layers together to form an integral composite, and the shaft is removed from the mandrel. Removal of the spikes 50 from the mandrel is accommodated by the open-ended slots 34 in the mandrel 30.

It will be appreciated that the above-described winding technique serves to mechanically lock shaft body 12 and sleeve 14 together. The spikes 50 serve to prevent longitudinal movement of the sleeve 14 relative to the shaft body 12 and are capable of transmitting high torque loadings therebetween. Dislodgement of the spikes 50 is prevented by the base plates 52 which limit radially inward travel of the spikes, and by the spike-retaining layer 60 of fibrous material which surrounds the base plates 52 and prevents radially outer travel of the spikes.

The sleeves 14 facilitate connection of the shaft to metal components such as metal yokes in a vehicle power train, since direct metal-to-metal welding contact is possible.

Although not necessary, it might be desirable to apply an adhesive between the sleeve 14 and initial layer 32 of fibrous material to augment the connection therebetween.

Although the mechanical lock concept of the present invention is disclosed in conjunction with a particular shaft body, it is to be understood that this concept has utility with composite shafts in general wherein fibrous reinforcement is present in a resinous matrix material.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

We claim:

1. A tubular fiber reinforced composite shaft comprising:
   a shaft body comprising a plurality of integrally bonded plies of solidified fiber reinforced resinous material;
   a metal sleeve mounted in at least one end of said shaft body;
   a plurality of pins extending through at least one of said plies and said sleeve, to create a torsion-transmitting connection between said shaft body and said sleeve; and
   said pins being mounted on arch-shaped plates, said plates being arranged such that circumferential ends of said plates are disposed in substantially end-to-end relationship so as to form a substantially continuous circumferential surface;
   an additional ply of solidified fiber reinforced resinous material extending around the said circumferential surface of said plates exteriorly of previously applied fibrous material to retain said pins.

2. A shaft according to claim 1, wherein said pins comprise sharpened spikes.

3. A shaft according to claim 1, wherein each plate carries a plurality of said spikes arranged in a longitudinally extending row.

4. A shaft according to claim 1, wherein said pins extend radially inwardly beyond radially inner ends of said apertures.

5. A method of forming a tubular fiber reinforced composite shaft comprising the steps of:
   positioning a metal sleeve upon a segment of a mandrel;
   applying fibrous material bearing a non-solidified resinous material upon said mandrel and the outer periphery of said sleeve;
   inserting pins inwardly through said previously applied fibrous material and into said sleeve;
   applying additional fibrous material bearing a non-solidified resinous material around the outer ends of said pins exteriorly of said previously applied fibrous material to retain said pins; and
   solidifying said resinous material with said pins disposed in said fibrous material and said sleeve to create a torsion-transmitting connection between said metal sleeve and said fibrous material; and
   removing said mandrel.

6. A method according to claim 5, wherein said positioning step comprises positioning a metal sleeve having a plurality of apertures therein, and aligning said apertures with openings in said mandrel, which openings are open at their longitudinal outer ends, said inserting step comprises inserting said pins into said apertures whereby radially inner ends of said pins project into said openings, and said removing step comprises longitudinally separating said shaft from said mandrel whereby said pins leave said mandrel by way of said longitudinally open ends of said openings.

7. A method according to claim 5, wherein said inserting step comprises inserting pins affixed to concave surfaces of arc-shaped plates, and arranging circumferential ends of said plates in substantially end-to-end relation.

8. A method according to claim 7, wherein said inserting step further comprises inserting pins arranged in a longitudinally extending row on each said plate.

9. A method of forming a tubular fiber reinforced composite shaft comprising the steps of:
   positioning a metal sleeve having a plurality of apertures therein upon a segment of a mandrel;
   applying fibrous material bearing a non-solidified resinous material upon said mandrel and over said apertures in said sleeve;
   inserting pins inwardly through said fibrous material and into said apertures such that enlarged arc-shaped plates affixed to outer ends of said pins abut said fibrous material with circumferential ends of said plates disposed substantially in end-to-end relationship so that said plates form a substantially continuous circumferential surface, and
   applying a retainer means around said plates to retain said pins,
   solidifying said resinous material with said pins disposed in said apertures to create a torsion-transmitting connection between said shaft body and said sleeve; and
   removing said mandrel.

10. A method according to claim 9, wherein said last-named applying step comprises applying additional fibrous material bearing said non-solidified resinous material around said plates.

11. A method according to claim 9, wherein said sleeve is positioned such that said apertures are aligned with openings in said mandrel which are open at their longitudinally outer ends, said inserting step being performed such that said pins extend beyond said apertures and into said openings.

12. A method according to claim 9, wherein said inserting step further comprises inserting pins arranged in a longitudinally extending row on each said plate.

* * * * *